March 28, 1939.  F. W. SCHARF  2,152,100
AUTOMATIC ELECTRIC TOASTER
Filed Feb. 19, 1937    3 Sheets-Sheet 1

INVENTOR.
Frank W. Scharf
BY
*J. M. Biebel*
ATTORNEY.

March 28, 1939.　　　F. W. SCHARF　　　2,152,100
AUTOMATIC ELECTRIC TOASTER
Filed Feb. 19, 1937　　　3 Sheets-Sheet 3

INVENTOR.
Frank W. Scharf
BY
ATTORNEY.

Patented Mar. 28, 1939

2,152,100

UNITED STATES PATENT OFFICE 2,152,100

AUTOMATIC ELECTRIC TOASTER

Frank W. Scharf, Western Springs, Ill., assignor to McGraw Electric Company, Chicago, Ill., a corporation of Delaware Application February 19, 1937, Serial No. 126,580

28 Claims. (Cl. 219—19)

My invention relates to toasters and particularly to thermally controlled timing means for electric toasters.

One object of my invention is to provide a relatively simple mechanism in a clock controlled electric toaster to vary the duration of a toasting operation in accordance with the toaster temperature.

Another object of my invention is to provide a toaster embodying a timing mechanism which is manually wound for each toasting operation by a member moved through a predetermined distance, the termination of the toasting operation being effected by thermally-controlled means which permits the clock mechanism to unwind to its initial condition.

Another object of my invention is to provide a thermally-controlled timing mechanism in which the thermally-actuable element is subjected to the temperature of the toaster frame, to direct radiant heat from the heating means and also to a through draft of cooling air.

Still another object of my invention is to provide a thermally responsive timing mechanism in which the thermally-actuable member is closely operatively associated with a mechanical timer, both of which are located outside of a toasting chamber.

Other objects of my invention will either be apparent from a description of one form of device embodying my invention or will be specifically pointed out in the course of such description.

Figure 1:
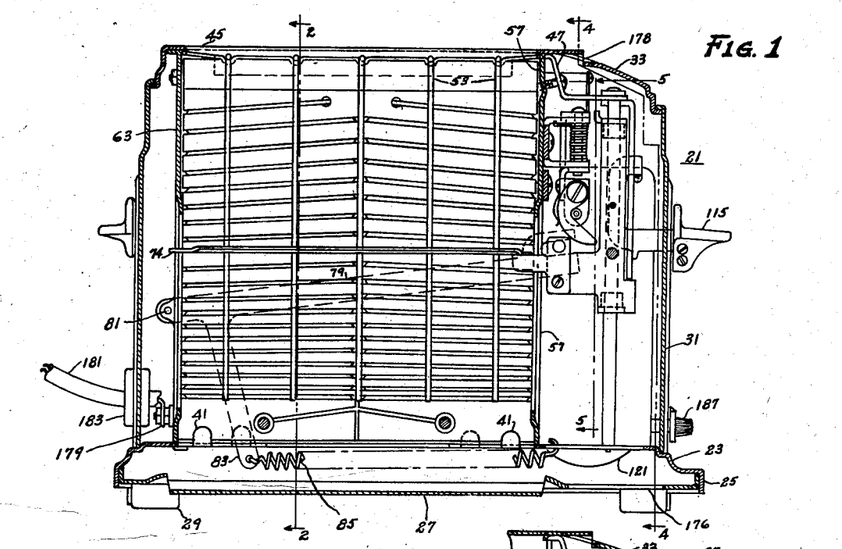
Figure 1 is a view in vertical longitudinal section through a toaster assembly having associated therewith the parts more particularly constituting my invention.
Figure 2:
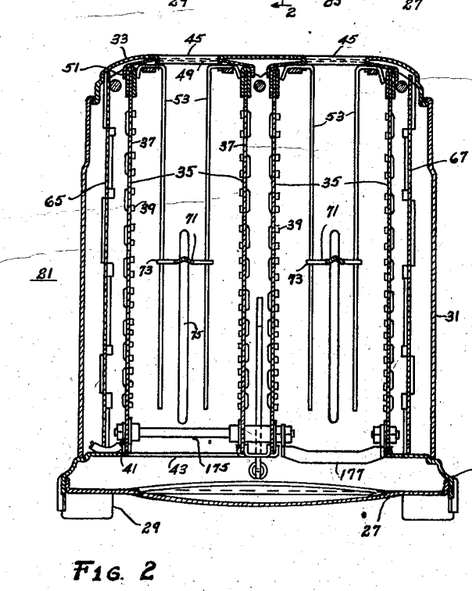
Fig. 2 is a view in vertical lateral section therethrough taken on the line 2—2 of Fig. 1.
Figure 3:
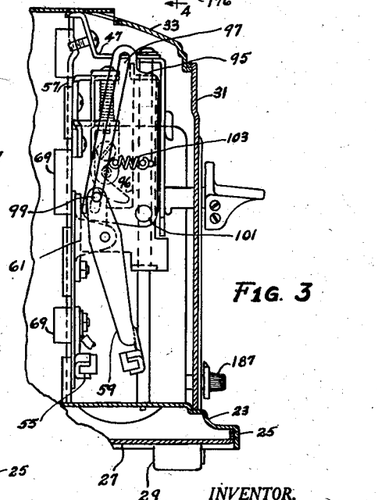
Fig. 3 is a fragmentary view, in vertical longitudinal section, taken on the line 3—3 of Fig. 4.

A toaster assembly designated generally by the numeral 21 includes a base 23 having a substantially flat upper surface as shown in Figs. 1 to 3, inclusive, and having also a depending flange portion 25 which is adapted to receive and support in proper operative position a crumb tray 27, which crumb tray is provided with feet 29 in a manner well known in the art. The assembly includes also an outer casing constituted by vertically extending walls 31 and a cover member 33 which do not constitute a part of my invention and are shown for illustrative purposes only. Any suitable or desired means for securing the casing portion 31 on or against the upper surface of base 23 may be utilized and since these do not constitute a part of my invention, they have not been shown in detail.

The toaster assembly includes also one or more pairs of electric heating elements 35 here shown as including sheets 37 of electric-insulating material, such as mica, having wound thereon a resistor strip or wire 39, the greater portion of said resistor element being located on that surface of its supporting sheet 37 adjacent to or facing the cooperating heating element in order that a slice of bread located between said heating elements shall receive substantially all of the radiant heat of the resistor on the pair of heating elements. The lower edges of the respective heating elements 35 are maintained in proper operative position by upwardly extending lugs 41 bent out of the plane of the sheet metal base 23, which sheet metal base is provided with a plurality of openings 43 therein, the cover 33 being provided with openings 45 therein to permit of putting in and removing from the space between the heating elements successive slices of bread to be toasted.

Upper horizontally-extending frames 47 are provided, one for each of the toasting chambers constituted more particularly by the spaced heating elements 35, which frames have longitudinally extending openings 49 therein registering with the openings 45 to permit of the introduction and removal of successive slices of bread. The upper ends of the heating elements 35 are held in proper operative position by depending lugs 51 integral with the respective top frames 47 at their outer edges and by return bent portions of guide wires 53 which extend through openings in the top frames 47 in a manner well known in the art.

The energization of the heating elements 35 is effected by a switch including more particularly a fixed contact member 55 insulatedly mounted on a part of a front intermediate wall 57 and by a pivotally mounted contact arm 59 also insulatedly mounted on and supported by the front wall 57 as by a bracket 61 (see particularly Fig. 3 of the drawings). A rear intermediate wall 63 cooperates with the front wall 57 and the vertically-extending flat heating elements 35 to constitute a toasting chamber and while I have shown two such toasting chambers, I do not desire to be limited thereto since the device more particularly embodying my invention and to be described in detail hereinafter may be associated with a single slice toaster as well. The space between the wall 57 and the front wall casing 31 may be termed the mechanism chamber.

Intermediate side walls or baffleplates 65 and 67 are provided and may be held in any suitable or desired manner, as by laterally bent lugs 69 on the respective front and rear intermediate walls 57 and 63, but these have been shown for illustrative purposes only and constitute no part of my present invention.

Figure 11:
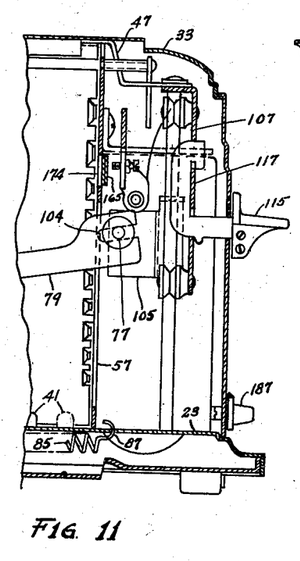
Fig. 11 is a fragmentary view, in vertical longitudinal section, taken on the line 11—11 of Fig. 4.
Figure 12:
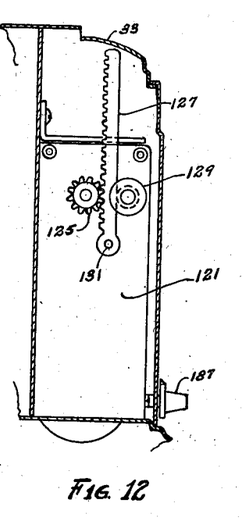
Fig. 12 is a fragmentary view in vertical longitudinal section, taken on the line 12—12 of Fig. 4.

Bread slice supports 71 are provided between each pair of electric heating elements 35 and are vertically movable relatively to the heating elements, a bread slice support being shown in non-toasting position in Figs. 1 and 2 of the drawings, from which position they may be moved downwardly until they are located near the bottom of the heating elements. The bread supports 71 are provided with a plurality of lateral extensions indicated by 73, through which extend the guide wires 53 in a manner now well known in the art, to thereby support a slice of bread in desired central position between the heating elements. The respective bread slice supports 71 extend rearwardly through the back wall 63 as shown at 74 in Fig. 1 of the drawings, through vertical slots 75 shown in Fig. 2 of the drawings, while they also extend through the front intermediate wall 57 and are connected by means of a rod 77 shown particularly in Fig. 11 of the drawings.

A pivotally mounted bar 79 (see Fig. 11) is supported on the rear wall 63 as by a pivot pin 81 (see Fig. 1) and has a depending arm 83 secured thereto or integral therewith to which one end of an extension coil spring 85 is connected, the other end of said spring being hooked in any one of a number of hook portions 87 provided in the top of base 23. This biases the bread slice supports to the upper or non-toasting position.

Figure 4:
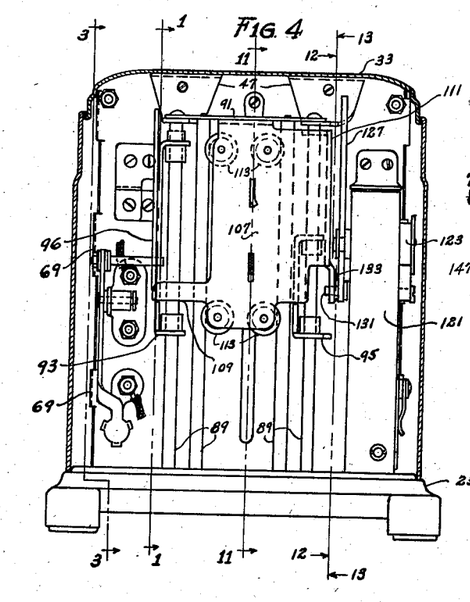
Fig. 4 is a view in vertical lateral section taken on the line 4—4 of Fig. 1.

Pairs of vertically extending guide rods 89 spaced a small distance apart as shown more particularly in Fig. 4 of the drawings are positioned in front of wall 57, the lower ends of the rods being secured to the base 23, while the upper ends of these rods are secured to and held by a cross bar 91, the outer of each pair of rods 89 being also held by forwardly extending parts of the frames 47. A vertically movable slider 93 is mounted on the outer of the left hand pair of rods 89 and a shorter somewhat similar slider 95 is mounted on the outer of the two right hand rods 89, as seen best in Fig. 4 of the drawings.

A plate 96 is mounted on slider 93 and as shown best in Fig. 3 of the drawings, is provided with a vertically angularly-extending slot 97 therein in which a pin 99 on the switch arm 59 is adapted to slide in order to effect actuation of this arm to close and open the switch. The plate 96 is pivotally mounted on the slider 93 as at 101 and a short spring 103 holds it yieldingly in a given position to thereby insure that the cooperating contacts 55 and the contact on the arm 59 will always be in tight operative engagement when pressed together. It is obvious that a downward movement of the slider 93 will effect closing of the switch comprising the contact 55 and arm 59, and therefore energization of the heating elements.

The rod 77 connecting the two bread slice supports moves in a slot 103 in the forward end of arm 79 and is connected by a plate 105 to slider 93 while a similar plate not particularly shown in the drawings connects the other end thereof to slider 95.

An actuating element for moving both sliders 93 and 95 in a downwardly direction to thereby move the bread support from non-toasting to toasting position and to simultaneously effect closing of the switch comprises a plate 107 which has a left hand lateral extension 109 to engage slider 93 and move it downwardly while at the same time it has a portion 111 (see Fig. 4) either surrounding the right hand outer rod 89 or located closely adjacent thereto and above the upper end of slider 95 to cause it also to move downwardly. The member 107 has mounted thereon by the lower edge of a recessed plate 133 which engage with the inner one of each pair of rods 89, as best seen in Fig. 4 of the drawings. An actuating knob 115 is secured to a member 117 of L-shape which is mounted on plate 107 and which extends through a slot in the front portion of casing 31 so that an operator may press on knob 115 and effect a downward movement of the actuating element. The parts just described may be considered as means to initiate a toasting operation.

A means for timing the duration of a toasting operation and energized simultaneously with the downward movement of actuating element 107, the movement of the bread supports into toasting position and the closing of the switch, includes a constant speed timing mechanism 121 shown generally only since it constitutes no part of my present invention, but which includes a spring 123, (see Fig. 4) a pinion 125 and a rack bar 127 engaging pinion 125 and held in proper operative position relatively thereto by a guide roller 129. The lower end of rack bar 127 is provided with a laterally extending pin 131 which is engageable by the lower edge of a recessed plate 133 which may either be secured to plate 107 or be integral therewith. It is obvious that when plate 107 is moved downwardly, rack bar 127 is also moved downwardly, and the design and construction is such that the clock mechanism is wound up to a predetermined degree by a downward movement of knob 115 and the associated parts will then immediately start to unwind causing a gradual upward movement of rack bar 127 and therefore a gradual upward movement of member 107 through the instrumentality of plate 133.

Figure 5:
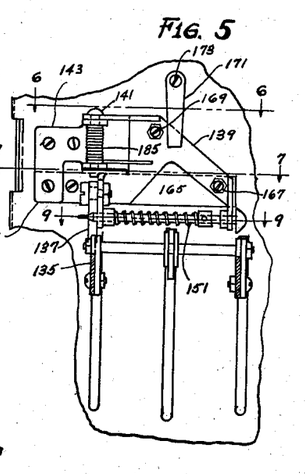
Fig. 5 is a fragmentary view in vertical section taken on the line 5—5 of Fig. 1.

A latching means for holding the switch in closed position and the bread supports in toasting position includes more particularly a small lug 135 secured to slider 93 and extending into the path of a latch 137 which is pivotally mounted on a swiveling frame 139 (see Fig. 5) which frame is pivoted on a pivot pin 141 secured to a bracket 143 which is mounted on the front surface of the front intermediate wall 57. Latch 137 is maintained in a position to engage lug 135 by a spring 145 shown generally only in Fig. 16 of the drawings, the upper end of which is secured to a part of skeleton frame 139. Any other suitable means effective for the same purpose may, however, be employed. Latch 137 is pivotally suspended on a pivot pin 147, which is aligned with the pivot pin 141 so that the frame 139 may have movement in a horizontal plane without affecting the engagement of member 137 with lug 135.

Means for effecting a swinging movement of latch 137 on its pivot pin is provided in the shape of a latch release pin 151 which is mounted in frame 139 to have axial movement relatively to its own length and which is maintained in inoperative position by a helical spring 153 and suitable cooperating collars and abutments.

Figure 9:
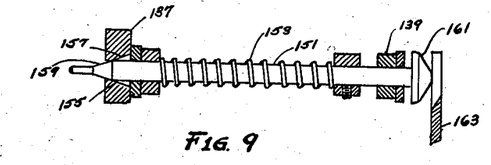
Fig. 9 is a view on an enlarged scale and taken on the line 9—9 of Fig. 5.
Figure 10:
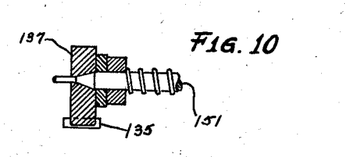
Fig. 10 is a fragmentary view of the left hand portion of Fig. 9.
Figure 14:
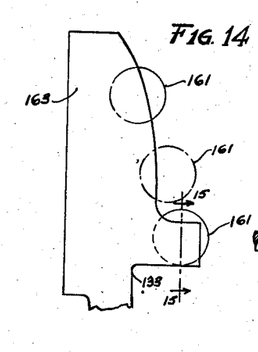
Fig. 14 is a fragmentary view showing more particularly the cam.
Figures 15, 16:
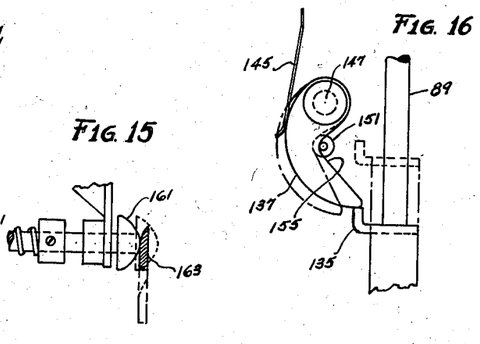
Fig. 15 is a fragmentary view in vertical section taken on the line 15—15 of Fig. 14.
Fig. 16 is a fragmentary view on an enlarged scale of the latch means in its engaged position.

Latch member 137 is of arcuate shape having a recess 155 therein as is shown best in Fig. 16 of the drawings and the shape of wall of the recess 155 is best shown in Figs. 9 and 10 of the drawings, and as there shown includes an angularly extending surface 157 adapted to be engaged by a conical end portion of pin 151. It may be noted that Fig. 9 of the drawings show the latch release pin 151 in actuated position while Fig. 10 shows it in its normal or inoperative position. The pin 151 is provided at its other end with a rounded head 161. A cam plate 163 which may either be integral with plate 133 or separate therefrom is mounted on member 107 and extends therefrom toward front wall 57 and into the path of head 161 of the latch release pin. The shape of the surface or of an edge of the cam 163 may be as shown in greater detail in Fig. 14 of the drawings where I have illustrated the relative positions of the head 161 of the pin for various operating conditions of the toaster, more particularly the temperature thereof. It is obvious that when a slice of bread is to be toasted in an initially cold toaster, a longer operating time will be required to toast the bread to the desired degree than will be the case after use of the toaster and a consequent rise of temperature thereof in a manner now well understood in the art. The lowermost position of head 161 as seen in Fig. 14 corresponds therefore to its position, controlled by means now to be described, when the toaster is cold, the intermediate one of said heads showing the position thereof when the toaster is partially warm and the uppermost one when the toaster is at its maximum normal operating temperature.

Figure 8:
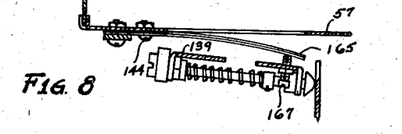
Fig. 8 is a view similar to Fig. 7 but showing the parts thereof in relatively different positions.
Figure 13:
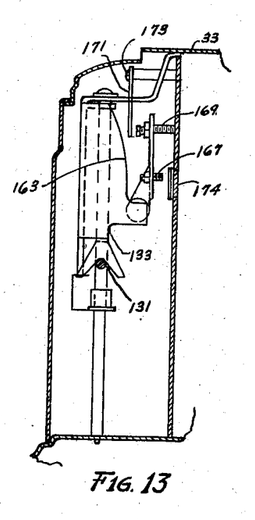
Fig. 13 is a view in vertical longitudinal section taken on the line 13—13 of Fig. 4.

Thermal means to effect this change of position of the head of the latch release pin includes a bimetal element 165 having one end thereof held by bracket 143 and by a screw 144, while the other end thereof is free to swing away from the front wall 57, as is best seen in Fig. 8 of the drawings, and operatively engage an adjusting screw 167 mounted on the frame 139, which frame is further provided with an adjusting screw 169 (see Fig. 5 of the drawings) to adjust the position of frame 139 relatively to the front wall 57. A stop member 171 is spaced from and mounted on the front wall 57 and is in the shape of a bar held by a machine bolt 173 (see Fig. 13).

The bimetal element 165 is subjected not only to the temperature of the toaster frame, particularly the temperature of the intermediate wall 57 to which one of its end portions is secured, but also to direct radiant heat from the heating elements 35 through an opening 174 in wall 57, as well as to a through draft of cooling air passing upwardly through the mechanism chamber. This cooling air enters through one or more openings 176 (Fig. 1) in base 23 and leaves through one or more openings 178 (Fig. 1) provided in the cover 33 above the mechanism chamber. While I have shown a bimetal bar I do not desire to be limited thereto as any equivalent thermally-actuable element may be used. It will be noted that thermal element 165 as well as the mechanical timer are closely operatively associated and are positioned outside of the toasting chamber.

Means for connecting the respective electrical resistor elements may comprise rods 175 and bars 177 (see Fig. 2) extending laterally between the respective heating elements, wires being provided at the proper points in the circuit to connect the fixed contact member 55 and the swinging arm 59 in circuit, a pair of terminal members 179 being provided on the rear intermediate wall 63 near the bottom end thereof to which a twin conductor cord 181 may extend, a bushing 183 being provided in the casing 31 in the rear wall thereof in a manner well known in the art.

Figure 6:
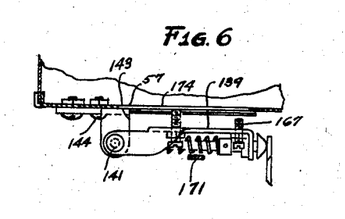
Fig. 6 is a fragmentary view in horizontal section taken on the line 6—6 of Fig. 5.
Figure 7:
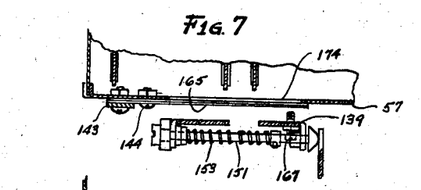
Fig. 7 is a view in horizontal section taken on the line 7—7 of Fig. 5.

Let it be assumed that an operator wishes to toast one or more slices of bread when the toaster structure is cold or is at room temperature. The adjustment of the bimetal bar 165 is such that it is in substantially the position shown in Figs. 6 and 7 of the drawings, that is in substantially flat-face engagement with the front wall 75. The swiveling frame 139 is therefore in a position closest to the front wall 57, being urged thereto by a spring 185 (see Fig. 5) and the returning manually-actuable element including the member 107 and particularly the cam 163 will engage the rounded head 161 at a relatively late time in the return movement of these elements, the head then being in the position shown by the lowermost circle designated 161 in Fig. 14 of the drawings. As soon as this engagement occurs, the head 161 and the pin 151 are moved axially to the left as seen in the various front view figures of the drawings, so that the conical surface 159 will effect a swinging movement of latch 137 to cause it to move out of engagement with lug 135, the actuated position of member 137 being best shown in Fig. 16 of the drawings. This permits return of the bread supports to their upper or non-toasting positions and the simultaneous opening of the switch, all of which is effected by the tensioned spring 85, to terminate a toasting operation. It will be noted that engagement of the cam and the release pin is positive with no tendency to drag and release of the latch is therefore also effected positively.

If a number of toasting cycles are effected in quick succession, it is obvious that since the high expansion component of bimetal element 165 is adjacent to the wall 57, the free end of element 165 is moved outwardly and latch release pin 151 and more particularly the head thereof is moved, say into the position shown by the middle circle 161 in Fig. 14 and finally into the position shown by the upper circle 161 of Fig. 14, thereby causing earlier latch-releasing engagement between the axially movable pin 151 and the cam 163. It may be here pointed out that the terminating means is actuated in accordance with the toaster temperature at substantially the end of the toasting operation.

I have found that the subjection of the thermally-actuable element to heat conducted thereto from the toaster frame or structure as well as to heat radiated against it directly from and by the heating means, results in a highly sensitive thermal element operating at relatively high temperatures. The presence of a through draft of cooling air results in quick reduction in the temperature of the thermal element when the toaster is not in use, so that the thermally controlled timing mechanism varies the duration of a toasting operation in accordance with toaster temperature, to toast successive slices of bread to substantially the same degree irrespective of the length of time intervals between successive toasting operations.

It is one of the important objects of my invention to permit the timer mechanism to return to its initial condition and it is obvious that this can be effected by the mechanism shown, since the head 161 will ride on the inner surface of cam plate 163 after the pin has been moved axially as hereinafter described to effect disengagement of members 137 and 135.

A knob 187 associated with the clock mechanism permits of manually varying the action of the mechanism to meet varying operating conditions, such as different line voltages, different kinds of bread, etc.

I am aware of a patent relating to a somewhat similar mechanism in which a cam is located in the path of a returning latch-actuating element, movable by a similar clock mechanism, but in this device the clock mechanism is not always permitted to unwind to its initial condition, which is undesirable. In contradistinction to this the elements more particularly constituting my invention effect winding of the clock mechanism to a predetermined degree in every case since the manually actuable elements must be moved through the full length of their possible travel in order to have the latch means effect a holding of the parts in their actuated positions. It is further obvious that the clock mechanism may unwind to its initial condition (irrespective of when the toasting operation is terminated) which is highly desirable since it introduces no fatigue effects into the clock spring which might vary the time of operation of the mechanism after the toaster has been in use for some time.

It is further obvious that release of the latching means can be effected at any time during the operation by merely moving knob 115 upwardly which moves the manual actuating element 107 upwardly, accompanied of course by upward movement of cam 163 and its engagement with the head 161 of the latch release pin and consequent release of the latch.

While I have illustrated and described a latch release plate, since an operative device embodying such element has been built and used by me, I do not desire to be limited thereto since a cam plate can be utilized by me, it being only necessary to vary the relative positions of the cam and of the head of the latch release pin or its equivalent member and provide sufficient axial movement of the latch release member to obtain substantially the same results, that is, an actuation of the latch release member at the desired time as controlled and determined by the thermal element, but at the same time permitting full unwinding of the clock mechanism, that is, unwinding thereof to its initial condition.

While I have illustrated and described a constant speed mechanical timer, it is obvious that my invention is not limited thereto, but that the inventive concept may be applied also to a constant speed clock mechanism or even to a purely thermal control.

Various modifications may be made in the device embodying my invention without departing from the spirit and scope thereof and I desire therefore that only such limitations shall be placed as are imposed by the prior art or are set forth in the appended claims.

I claim as my invention:

1. In an electric toaster, the combination with electric heating means, a control switch therefor biased to open position, a constant speed mechanical timer, a manually actuable member movable in one direction to effect closing of said switch and winding-up of said timer and adapted to be returned to its initial cold position by the timer and a latch means to hold the switch in closed position, of thermally controlled means including a latch release member and a cam plate on the manually actuable member adapted to cooperate to release the latch to effect opening of the switch after a length of time dependent on the temperature of the toaster at substantially the end of the toasting operation.

2. In an electric toaster, the combination with heating means, a bread slice support movable relatively to the heating means into toasting and non-toasting position, means to bias the support to non-toasting position, a constant speed mechanical timer, a manually-actuable means movable in one direction to effect closing of a control switch to effect movement of the bread support to toasting position and winding up of the timer and adapted to be returned to its initial cold position by the timer and a latch means adapted to hold the bread support in toasting position, of thermally-actuable means including a latch release member and a cam plate on the manually actuable means adapted to operate to release the latch to effect return of the bread support to non-toasting position after a length of time dependent on the temperature of the toaster at substantially the end of the toasting operation.

3. A toaster as set forth in claim 1 in which the thermally controlled means is so designed and constructed that the mechanical timer may unwind to its initial cold condition irrespective of when the latch is released.

4. A toaster as set forth in claim 2 in which the thermally-actuable means is so designed and constructed that the mechanical timer may unwind to its initial cold condition irrespective of when the latch is released.

5. In an electric toaster, the combination with electric heating means, a control switch therefor biased to open position, a bread slice support movable into toasting and non-toasting position relatively to the heating means and biased to non-toasting position, a constant speed mechanical timer, a manually-actuable means movable in one direction to effect closing of the switch, movement of the bread slice support into toasting position and winding up of the timer and adapted to be returned to its initial cold position by the timer and latch means adapted to hold the switch closed and the bread slice support in toasting position, of thermally controlled means including a latch release member and a cam plate on the manually actuable means adapted to cooperate to release the latch means to effect return of the bread slice support to non-toasting position and opening of the switch after a length of time dependent on the temperature of the toaster at substantially the end of the toasting operation.

6. A toaster as set forth in claim 5 in which the thermally controlled means is so designed and constructed that the timer may unwind to its initial cold condition irrespective of the latch release time.

7. In a toaster, the combination with a casing, a heating means therein, means adapted to control the energization of the heating means biased to deenergizing position, manually actuable means to move the control means to energizing position and a latch to hold it in energizing position, of means to effect release of said latch after a length of time dependent on toaster temperature, said release means including a cam member, a latch release member adapted to engage and be actuated by the cam member, a mechanical timer adapted to move one of said members relatively to the other member to effect release of the latch and to move the manually actuable means to its initial cold position and a thermally-actuable element adapted to actuate one of said members to vary the positions of said members relatively to each other in dependence on the toaster temperature to vary the length of time after which the latch is released.

8. A toaster as set forth in claim 7 in which the thermally actuable element is so located as to be subjected to radiant heat direct from the heating means, to the temperature of the toaster frame and to a through draft of cooling air caused by the heating means when the toaster is being operated.

9. A device as set forth in claim 7 in which the direction of the movement effected by the thermally-actuable element is at substantially a right angle to the direction of the movement effected by the timer.

10. In a toaster, the combination with a casing, a heating means therein, means adapted to control the energization of the heating means biased to de-energizing position, means to move the control means to energizing position and a latch for holding it in energizing position, of means to effect release of said latch after a length of time dependent on the temperature of the toaster, said release means including a cam member, a latch release member adapted to engage and be actuated by the cam member, a mechanical timer adapted to move one of said members relatively to the other member to effect release of said latch and a thermally actuable element adapted to act on the other of said members to vary the positions of said members relatively to each other in dependence on the temperature of the toaster to vary the length of time after which the latch is released, the direction of the movement of the other member effected by the thermally actuable element being at substantially a right angle to the direction of movement of said one member effected by said timer.

11. In a toaster, the combination with a casing, an electric toasting element therein, a front intermediate vertical wall between the toasting element and the front wall of the casing, a switch adapted to control the toasting element, a bread slice support movable into toasting and non-toasting position relatively to the toasting element, means to bias the switch to open position and the bread slice support to non-toasting position, means to move the bread slice support to toasting position and the switch to closed position and a latch means to hold the switch in closed position and the bread slice support in toasting position, of means to effect release of the latch after a time interval the length of which is dependent on the temperature of the toaster, said release means including a cam member, a latch release member adapted to engage and be actuated by the cam member, a mechanical timer adapted to be wound up by the means moving the bread slice support to toasting position and closing the switch and adapted also to automatically cause opening of the switch and return of the bread slice support to non-toasting position and a bimetal bar positioned on the front intermediate vertical wall adapted to receive heat by conduction from the toaster, adapted to cooperate with the timer to vary the length of time before the switch is opened and the bread slice support is returned to non-toasting position in dependence on toaster temperature.

12. In an electric toaster, the combination with an electric heater, a control switch therefor biased to open position, a clock mechanism, and a manually-actuable member movable in one direction to effect closing of said switch and winding of the clock mechanism and adapted to be returned to its initial cold position by the clock mechanism after each toasting operation, of a swivelling latch means for holding the switch in closed position including a latch-releasing member biased to inoperative position, a cam on the manually-actuable member adapted to engage said latch-releasing member to move the same and effect release of said latch means at the end of a predetermined length of time and a thermally-controlled member responsive to toaster temperature adapted to operatively engage the swivelling latch to shift the point of engagement of the cam and the latch-releasing member to vary said predetermined length of time in accordance with toaster temperature at substantially the end of the toasting operation.

13. In a toaster, the combination with an electric heater, a control switch therefor biased to open position, a clock mechanism and a manually-actuable member movable in one direction to effect closing of said switch and winding of the clock mechanism and adapted to be returned to its initial position by the clock mechanism, of a swivelling latch means for holding the switch in closed position including an axially-movable latch-release pin biased to inoperative position, a cam plate on the manually-actuable member adapted to have slidable flat-face engagement with said pin to move the same axially and cause release of said latch and a thermally-actuable member responsive to toaster temperature adapted to operatively engage the swivelling latch means to shift the point of engagement of said pin with said cam plate in accordance with toaster temperature.

14. In a toaster, the combination with an electric heater, a control switch therefor biased to open position, a mechanical timer, a manually-actuable means movable in one direction to effect closing of said switch and winding of the timer and adapted to be returned to its initial cold position by the timer after each toasting operation and a swivelling latch means for holding the switch in closed position, of a cam plate on the manually-actuable member, a latch-release pin biased to inoperative position and having one end located in the path of travel of one face of said cam plate and a thermal element responsive to toaster temperature operatively engaging the latch-release pin to vary the relative positions of the release pin and the cam plate to thereby vary the length of time of a toasting operation in accordance with toaster temperature.

15. In a toaster, the combination with an electric heater, a bread slice support movable relatively to the electric heater into toasting and non-toasting position and biased to non-toasting position, a clock mechanism, a manually-actuable means movable in one direction to effect movement of the bread support to toasting position and winding of the clock mechanism and adapted to be returned to its initial position by the clock mechanism during a toasting operation and a swivelling latch means for holding the bread support in toasting position, of a cam plate on the manually-actuable means, a latch release pin biased to inoperative position and having one end thereof located in the path of travel of one face of said cam plate and a thermal member responsive to toaster temperature operatively engaging the latch-release pin adapted to shift the relative positions of the pin and the cam plate to vary the length of time of a toasting operation in accordance with the temperature of the toaster.

16. In a toaster, the combination with an electric heater, a control switch therefor biased to open position, a clock mechanism, a movable means manually-actuable in one direction to effect closing of said switch and winding of the clock mechanism and adapted to be returned to its initial cold position by the clock mechanism during and after the toasting operation and a latch means for holding the switch closed, of a normally-inoperative latch-release member, a cam member on said manually-actuable means adapted to engage and actuate said latch-release member during the return movement of said manually-actuable means and a thermally-actuable element responsive to toaster temperature operatively engaging one of said members to effect a change of engaging position therebetween to vary the length of time of a toasting operation in accordance with toaster temperature.

17. Advice as set forth in claim 16 in which the clock mechanism may unwind to its initial cold condition irrespective of when the latch-release member is actuated during the return movement of the manually actuable means.

18. In a toaster, the combination with an electric heater, a control switch therefor biased to open position, a clock mechanism, a member normally located in one position and manually-movable through a given distance in one direction to effect closing of the switch and winding up the clock mechanism and returnable to its initial position by the unwinding of the clock during a toasting operation and a latch means for holding the switch closed, of a thermally-controlled latch-releasing means including a cam plate on the manually-movable member, a normally-inoperative latch-release pin one end of which is located in the path of the return travel of one face of said cam plate and movable therealong after latch-releasing action thereof whereby unwinding of the clock mechanism to its initial condition may occur and a thermal element responsive to toaster temperature adapted to operatively engage the latch release pin to move the same relatively to the cam plate and vary the point of engagement therebetween and thereby vary the duration of a toasting operation in accordance with toaster temperature.

19. In a toaster, the combination with an electric heater, a bread slice support movable relatively to said heater into toasting and non-toasting position and biased to non-toasting position, a clock mechanism and a member connected to the bread support and manually-movable in one direction to move the bread support to toasting position and to wind the clock mechanism and adapted to be returned to its initial position by the unwinding of the clock, of a swivelling latch means for holding the bread support in toasting position including an axially-movable latch-release pin biased to inoperative position, a cam plate on the manually-movable member adapted to have slidable flat-face engagement with one end of said pin to move the same axially and cause release of the latch and a thermally-actuable member responsive to toaster temperature adapted to operatively engage the swivelling latch means to shift the point of engagement of the end of said pin with said cam plate and thereby vary the time of release of said latch.

20. In a toaster, the combination with an electric heater, a bread slice support movable relatively to said heater into toasting and non-toasting positions and normally biased to non-toasting position, a clock mechanism, a member normally located in one position and manually-movable therefrom in one direction and connected to thereby move the bread support into toasting position and to wind the clock mechanism and returnable to its initial position by the unwinding of the clock mechanism and a latch for holding the bread support in toasting position, of a swivelling axially-movable latch-release pin biased to inoperative position, a cam plate on the manually-movable member adapted to have slidable flat-face engagement with one end of said pin to move the same axially and cause release of the latch during the return movement of the manually-movable member and a thermal element responsive to toaster temperature adapted to operatively engage the swivelling latch-release pin and shift the point of engagement of the end of said pin with said cam plate to vary the time of release of said latch.

21. In a toaster, the combination with an electric heater, a control switch therefor, a bread slice support movable to toasting and to non-toasting position relatively to said heater, a spring biasing said switch to open position and the bread support to non-toasting position, a clock mechanism, a member normally biased to one position by said spring and manually-movable in one direction and connected to thereby cause closing of the switch, movement of the bread support to toasting position and winding of the clock mechanism and returnable to its initial position by the unwinding of the clock mechanism during a toasting operation and a latch means for holding the switch closed and the bread support in toasting position, of a thermally-controlled latch-releasing means including a cam plate on the manually-movable member, a pivotally-mounted latch-release pin biased to inoperative position, one end of said pin being located in the path of the return travel of one face of said cam plate and movable therealong after latch-releasing action thereof whereby unwinding of the clock mechanism to its initial condition may occur and a thermal element responsive to toaster temperature operatively engaging the latch-release pin to shift said one end thereof relatively to the cam plate to vary the point of engagement of the pin and the cam plate and thereby vary the duration of a toasting operation.

22. In an oven type toaster, the combination with a pair of spaced electric heaters, front and back walls cooperating with said heaters to constitute a toasting chamber, a control switch for aid heaters biased to open position, a clock mechanism located adjacent one of said walls, a frame adjacent said one wall vertically manually-movable in one direction and connected to thereby wind up the clock mechanism and effect closing of the switch and returnable to its initial position by the unwinding of the clock mechanism during a toasting operation and a latch for holding the switch closed, of a thermally-controlled latch-release means including a cam plate secured to said frame, a frame supporting said latch pivotally supported on said one wall, a latch-release pin supported for axial movement in said pivotally-mounted frame, normally biased to inoperative position and having one end thereof located in the path of the return travel of one face of said cam plate and movable therealong after latch-releasing engagement therebetween whereby unwinding of the clock mechanism to its initial condition may occur and a bimetal bar mounted on said one wall and subjected to the temperature of the toasting chamber and adapted to operatively engage said pivotally-mounted frame to cause movement of said one end of said latch-release pin relatively to said cam plate to shift the point of engagement therebetween to thereby vary the duration of a toasting operation.

23. In a vertical oven type toaster, the combination with a pair of spaced flat vertically-extending electric heaters, vertical front and back walls cooperating with said spaced electric heaters to define a toasting chamber, a control switch for said heaters biased to open position, a clock mechanism located adjacent said front wall, and an actuating structure adjacent said front wall manually movable through a given distance in a downwardly direction and connected to thereby effect closing of said switch and winding of the clock mechanism and returnable to its initial position by the unwinding of the clock mechanism, of a frame having a pivotal mounting on said front wall, a latch means thereon, a cam plate on the actuating structure, a latch-release pin mounted on said pivotally-mounted frame and biased to inoperative position and having one end thereof located in the path of the return travel of one face of said cam plate and movable therealong after latch-releasing engagement therebetween whereby unwinding of the clock mechanism to its initial condition may occur and a bimetal bar having one end operatively secured to said front wall and its movable end adapted to operatively engage the pivotally-mounted frame to cause movement of said one end of the latch-releasing pin relatively to said cam plate to vary the point of engagement therebetween to vary the duration of the toasting operation.

24. In a vertical oven type toaster, the combination with a pair of spaced flat vertically-extending electric heaters, vertical front and back walls cooperating with said spaced heaters to define a toasting chamber, a control switch for said heaters, a bread slice support in said toasting chamber movable relatively to said heaters into toasting and non-toasting positions, a single means connected to bias the switch to open position and the bread support to non-toasting position, a clock mechanism and an actuating structure manually-movable in a downwardly direction through a given distance and connected to thereby effect closing of the switch, movement of the bread support to toasting position and winding of the clock mechanism, said structure being returnable to its initial position by the unwinding of the clock mechanism, of a frame having a pivotal mounting on said front wall, a latch means adapted to hold the switch in closed position and the bread support in toasting position, a cam plate on the actuating structure, a latch release pin mounted for axial movement on said pivotally-mounted frame, biased to inoperative position and having one end thereof located in the path of the return travel of one face of said cam plate and movable along said one face after latch-releasing engagement therebetween whereby unwinding of the clock mechanism to its initial condition may occur and a bimetal bar having one end operatively secured to said front wall and having its movable end adapted to operatively engage the pivotally mounted frame to cause movement of said one end of the pin relatively to said cam plate laterally of its path of travel to shift the point of engagement therebetween to vary the time of actuation of said latch-release pin.

25. In a toaster, the combination with a casing, electric toasting means therein, a vertical intermediate wall in the casing to provide a toasting chamber and a mechanism chamber and means to initiate a toasting operation, of means to automatically terminate a toasting operation after a time interval the length of which is dependent on the temperature of the toaster, said terminating means including a thermally-actuable element positioned against the vertical intermediate wall in the mechanism chamber to subject the element to heat conducted through the intermediate wall and subjected also to radiant heat directly from the toasting means and to a draft of cooling air caused by the toasting means and flowing through the mechanism chamber.

26. In a toaster, the combination with a casing, electric toasting means therein, a vertical intermediate wall in the casing providing a toasting chamber and a mechanism chamber and means to initiate a toasting operation, of means to automatically terminate a toasting operation after a time interval the length of which is dependent on the temperature of the toaster, said terminating means including a mechanical timer in the mechanism chamber and a thermally-actuable element adapted to cooperate with the timer to vary the length of a toasting operation, said thermally-actuable element being located in the mechanism chamber subject to heat conducted to it from the vertical intermediate wall, to radiant heat directly from the toasting means and to a current of cooling air created by the toasting means and flowing through the mechanism chamber.

27. In an automatic toaster, the combination with electric heating means, a bread support movable relatively to said heating means into toasting and non-toasting positions relatively to said heating means and biased to non-toasting position, means to move the bread support to toasting position and a latch to hold the bread support in toasting position, of means to effect release of said latch after a length of time dependent on toaster temperature, said release means including a cam member, a latch release member adapted to engage and be actuated by the cam member, a mechanical timer adapted to move one of said members relatively to the other member to effect release of the latch and to move the bread support to non-toasting position and a thermally-actuable element for actuating one of said members to vary the position of said members relatively to each other in dependence on the toaster temperature to vary the length of time after which the latch is released.

28. In an automatic toaster, the combination with an electric heater, a bread support movable into toasting and non-toasting positions relatively to said heater and biased to non-toasting position, a mechanical timer, means to move the support to toasting position and wind up the timer and a latch to hold the support in toasting position, of a normally-inoperative member for effecting release of said latch after a time interval, a cam member movable by said mechanical timer during the unwinding thereof adapted to engage and actuate said latch-release member and a thermally-actuable element responsive to toaster temperature for engaging one of said members to effect a change of engaging position therebetween to vary the time interval after which release of the latch is effected in accordance with toaster temperature.

FRANK W. SCHARF.